United States Patent
Foo et al.

[11] Patent Number: 5,826,902
[45] Date of Patent: Oct. 27, 1998

[54] METHOD AND APPARATUS FOR SENSING IMPACT CRASH CONDITIONS WITH SAFING FUNCTION

[75] Inventors: Chek Peng Foo, Ann Arbor; Huahn Fern Yeh, Novi; Roger A. McCurdy, Troy, all of Mich.

[73] Assignee: TRW Inc., Lyndhurst, Ohio

[21] Appl. No.: 589,846

[22] Filed: Jan. 22, 1996

Related U.S. Application Data

[63] Continuation-in-part of Ser. No. 490,175, Jun. 15, 1995.

[51] Int. Cl.⁶ .................................................. B60R 21/32
[52] U.S. Cl. ............................................................ 280/735
[58] Field of Search ................................... 280/734, 735, 280/730.2; 340/438, 439, 440, 436; 180/274, 282

[56] References Cited

U.S. PATENT DOCUMENTS

| | | | |
|---|---|---|---|
| 3,720,426 | 3/1973 | Johnston . | |
| 3,889,232 | 6/1975 | Bell . | |
| 4,958,851 | 9/1990 | Behr et al. . | |
| 5,037,129 | 8/1991 | Fritz et al. . | |
| 5,172,790 | 12/1992 | Ishikawa et al. | 180/268 |
| 5,208,484 | 5/1993 | Okano et al. | 307/10.1 |
| 5,322,323 | 6/1994 | Ohno et al. . | |
| 5,338,062 | 8/1994 | Kiuchi et al. . | |
| 5,357,141 | 10/1994 | Nitschke et al. | 307/10.1 |
| 5,392,024 | 2/1995 | Kuchi et al. | 280/735 |
| 5,428,534 | 6/1995 | Wetzel | 280/735 |
| 5,468,013 | 11/1995 | Gille | 280/735 |
| 5,484,166 | 1/1996 | Mazur et al. | 280/735 |

FOREIGN PATENT DOCUMENTS

| | | |
|---|---|---|
| 320674 | 1/1991 | Japan . |
| 4176754 | 6/1992 | Japan . |

*Primary Examiner*—Eric D. Culbreth
*Attorney, Agent, or Firm*—Tarolli, Sundheim, Covell, Tummino & Szabo

[57] ABSTRACT

An apparatus (10) for controlling actuation of a first actuatable restraint (18) and a second actuatable restraint (20) includes a first crash accelerometer (22) for providing a discriminating crash acceleration signal when a crash event is sensed in a first direction and a safing crash acceleration signal when a crash event is sensed in a second direction. A second crash accelerometer (34) provides a safing crash acceleration signal when a crash event is sensed in the first direction and a discriminating crash acceleration signal when a crash event is sensed in the second direction. A third crash accelerometer (90) provides another safing crash signal when a crash event is sensed in either the first or second directions. The first actuatable restraint (18) is actuated when the first accelerometer (22) provides the discriminating crash acceleration signal and either the second or third accelerometers provide a safing crash signal. The second actuatable restraint (20) is actuated when the second accelerometer (34) provides a discriminating crash signal and either the first or the third accelerometer provides a safing crash signal.

9 Claims, 4 Drawing Sheets

METHOD AND APPARATUS FOR SENSING IMPACT CRASH CONDITIONS WITH SAFING FUNCTION

CROSS-REFERENCE TO RELATED APPLICATION

This application is a continuation-in-part of co-pending patent application to Foo et al., Ser. No. 08/490,715 filed Jun. 15, 1995, entitled "METHOD AND APPARATUS FOR PROVIDING A SAFING FUNCTION FOR SIDE IMPACT CRASH SENSING SYSTEMS" and assigned to TRW Inc, pending.

BACKGROUND OF THE INVENTION

1. Technical Field

The present invention is directed to an occupant restraint system in a vehicle and specifically to a method and apparatus for sensing a side impact crash condition with a safing function.

2. Description of the Prior Art

Systems for restraining vehicle occupants during front and side impacts are known in the art. A side restraint system includes an air bag assembly, each vehicle side seat location having an associated air bag assembly. A controller is connected to the assembly. The controller controls actuation of the air bag in response to signals provided from a plurality of crash sensors. Typically, each air bag assembly has an associated crash sensor mounted in the associated side assembly of the vehicle. A typical crash sensor is a "crush sensor" such as a contact switch which detects the crushing of a vehicle door during a side impact.

Front restraint systems typically include two crash sensors. One of the crash sensors functions as a "primary" crash sensor. The other crash sensor is referred to as a safing crash sensor. Actuation of the restraint system requires detection of a deployment crash condition by both the primary sensor and the safing sensor.

SUMMARY OF THE INVENTION

In accordance with the present invention, crash sensors are provided on each side of the vehicle for sensing side impacts. A controller monitors both of the crash sensors. Each of the crash sensors function as a discriminating crash sensor and as a safing crash sensor depending on the direction of the crash event. Therefore, each of the sensors perform a selected one of two possible functions. A third crash sensor is provided at a central location of the vehicle and functions as a secondary safing crash sensor. A restraint is actuated when the discriminating crash sensor and when either the safing sensor or the secondary safing sensor senses a crash event.

In accordance with one aspect of the present invention, an apparatus for controlling an actuatable restraint comprises first acceleration sensing means having an axis of sensitivity and mounted to the vehicle at a first location of the vehicle with the axis of sensitivity of the first acceleration sensing means oriented in a first direction. The first acceleration sensing means provides a discriminating crash signal when crash acceleration is sensed in the first direction. Second acceleration sensing means is provided having an axis of sensitivity and mounted to the vehicle at a second location of the vehicle with the axis of sensitivity of the second acceleration sensing means being oriented substantially parallel with the first direction and 180 degrees from the axis of sensitivity of the first acceleration sensing means. The second acceleration sensing means provides a safing crash signal when crash acceleration is sensed in the first direction. Third acceleration sensing means is provided having an axis of sensitivity and mounted to the vehicle at a third location of the vehicle with the axis of sensitivity of the third acceleration sensing means being substantially parallel with the first direction. The third acceleration sensing means provides a secondary safing crash signal when crash acceleration is sensed in the first direction. The apparatus further includes means for actuating the actuatable restraint when the first crash sensing means provides the discriminating crash signal and when either (i) the third crash sensing means provides the secondary safing crash signal or (ii) the second crash sensing means provides the safing crash signal.

In accordance with another aspect of the present invention, an apparatus for controlling actuation of a first actuatable restraint and a second actuatable restraint comprises first crash sensing means for providing a discriminating crash signal when a crash event is sensed in a first direction and a safing crash signal when a crash event is sensed in a second direction. Second crash sensing means provides a safing crash signal when a crash event is sensed in the first direction and a discriminating crash signal when a crash event is sensed in the second direction. The apparatus further includes third crash sensing means for providing a secondary safing crash signal when a crash event is sensed in either the first direction or the second direction. Means are provided for actuating the first actuatable restraint when the first crash sensing means provides the discriminating crash signal and when either (i) the third crash sensing means provides the secondary safing crash signal or (ii) the second crash sensing means provides the safing crash signal. The apparatus further includes means for actuating the second actuatable restraint when either (i) the first crash sensing means provides the safing crash signal or (ii) the third crash sensing means provides the secondary safing crash signal, and when the second crash sensing means provides the discriminating crash signal.

In accordance with another embodiment of the present invention, a method for controlling actuation of a first actuatable restraint and a second actuatable restraint comprises the step of sensing a crash acceleration using a first acceleration sensor. The first acceleration sensor provides a discriminating crash signal when a crash event is sensed in a first direction and provides a safing crash signal when a crash event is sensed in a second direction. The method further comprises the step of sensing a second crash acceleration using a second acceleration sensor. The second acceleration sensor provides a safing crash signal when a crash event is sensed in the first direction and providing a discriminating crash signal when a crash event is sensed in the second direction. The method also includes the step of sensing a crash acceleration using a third crash sensing means and providing a secondary safing crash signal when a crash event is sensed. The method further includes the step of actuating the first actuatable restraint when the first crash sensing means provides the discriminating crash signal and when either (i) the third crash sensing means provides the secondary safing crash signal or when (ii) the second crash sensing means provides said safing crash signal, and actuating the second actuatable restraint when either (i) the first crash sensing means provides the safing crash signal or (ii) the third crash sensing means provides the secondary safing crash signal, and when the second crash sensing means provides the discriminating crash signal.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENTS

Figure 1:
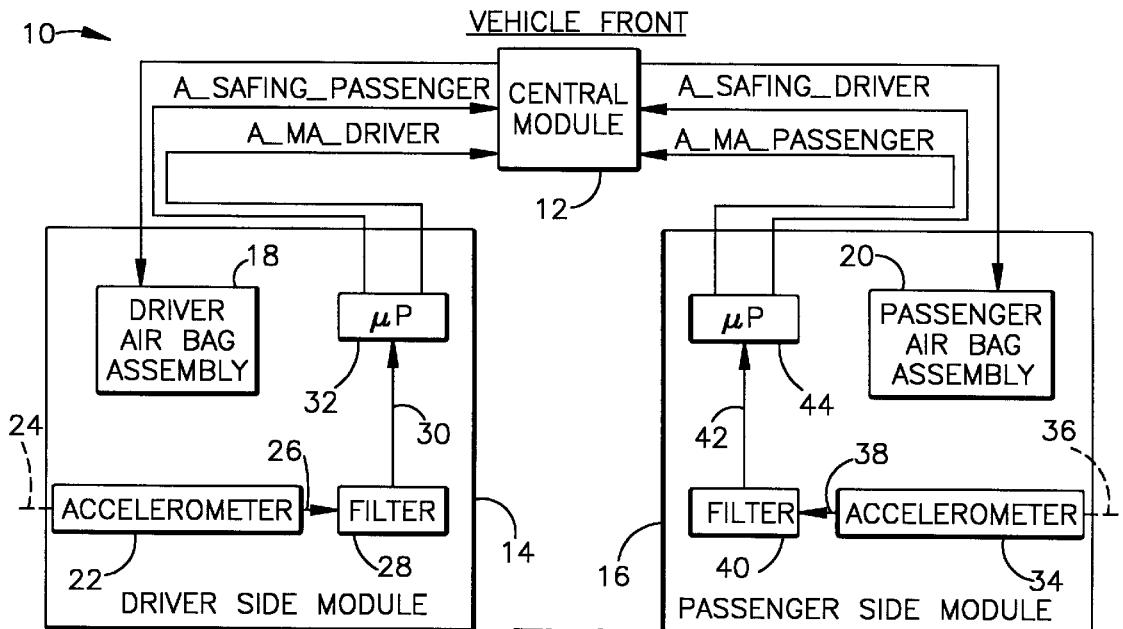
FIG. 1 is a block diagram of a vehicle side impact restraint system in accordance with one embodiment of the present invention.

Referring to FIG. 1, a vehicle side impact restraint system 10, in accordance with one embodiment of the present invention, includes a central control module 12. The central control module 12 is preferably a microcomputer programmed to execute a desired control process. A driver's side module 14 is connected to the central control module 12. A passenger's side module 16 is connected to the central control module.

The driver's side module 14 includes an accelerometer 22. The accelerometer 22 senses acceleration in a direction parallel to its axis of sensitivity 24 and provides an accelerometer signal 26 indicative of the sensed crash acceleration along its axis of sensitivity. The accelerometer 22 is, in accordance with one embodiment, mounted in a vehicle driver's side door such that its axis of sensitivity 24 is transverse to the vehicle direction of travel, i.e., transverse to the fore and aft direction of the vehicle. The accelerometer 22 may be mounted at other locations on the driver's side of the vehicle such as the B-pillar or floor cross member. The axis of sensitivity 24 is oriented so that the acceleration signal 26 has a positive value when the sensed acceleration has a component toward the center of the vehicle, i.e., into the door. When an impact into the driver side of the vehicle occurs, the acceleration signal 26 has a positive value. An impact to the passenger side of the vehicle will result in the acceleration signal 26 having a negative value.

A filter 28 filters the acceleration signal 26 and outputs a filtered acceleration signal 30. The filter 28 functions as an anti-alias filter to block frequencies in the acceleration signal above a certain cutoff value. Such frequencies could result in aliasing of the analog filtered acceleration signal 30 when this signal is converted to a digital signal.

A microcomputer 32 periodically samples the filtered acceleration signal 30 and performs an analog-to-digital ("A/D") conversion on each sample. The A/D conversion of a sample results in a digital value representing the analog value of that sample. The sample rate of the microcomputer 32 is chosen to satisfy known sampling criteria and guarantee that the digital values accurately represent the filtered acceleration signal 30.

The passenger side module 16 is similar to the driver side module 14. It includes an accelerometer 34 which senses acceleration along its axis of sensitivity 36 and provides an acceleration signal 38 indicative thereof. The accelerometer 34 is, in accordance with one embodiment of the present invention, mounted in a vehicle passenger side door such that its axis of sensitivity 36 is substantially transverse to the vehicle direction of travel, i.e., substantially transverse to the fore and aft direction of the vehicle. The accelerometer 34 may be mounted at other locations on the passenger's side of the vehicle such as the B-pillar or floor cross member. The axis of sensitivity 36 is oriented so that the acceleration signal 38 has a positive value when the sensed acceleration has a component into the passenger side of the vehicle. Thus, when an impact to the passenger side of the vehicle occurs, the acceleration signal 38 has a positive value. An impact to the driver side of the vehicle will, conversely, cause the acceleration signal 38 to have a negative value.

A filter 40 filters the acceleration signal 38 and outputs a filtered acceleration signal 42. The filter 40 functions as an anti-alias filter to block frequencies above a cutoff value which could result in aliasing when the analog filtered acceleration signal 42 is converted to a digital signal.

A microcomputer 44 periodically samples the filtered acceleration signal 42 and performs a conversion on each sample. The A/D conversion of a sample results in a digital value representing the analog value of that sample. The sample rate of the microcomputer 44 is chosen to satisfy known sampling criteria and guarantee that the digital values accurately represent the filtered acceleration signal 42.

Since the vehicle acceleration monitored by each accelerometer 22 and 34 has two sensing capabilities, i.e., positive and negative or into the driver's or passenger's side, the single sensor associated with a single side of the vehicle can serve two functions. First, a positive crash acceleration value from the driver's side accelerometer 22 is used to detect a crash event into the driver's side of the vehicle. In this mode, the sensor functions as a discriminating sensor. Second, the negative output from the driver's side accelerometer 22 is used as a passenger's side safing function for the purpose of verifying an event into the passenger's side of the vehicle.

Similarly, the positive acceleration signal from the passenger's side accelerometer 34 is used to detect a crash event into the passenger's side of the vehicle. In this mode, the sensor functions as a discriminating sensor. A negative output from the passenger's side accelerometer 34 is used as the driver's side safing function to verify a crash event into the driver's side of the vehicle. In accordance with this embodiment, actuation of a driver's associated restraint device occurs only after a driver's side accelerometer detects a deployment crash event into the driver's side and the passenger's side accelerometer verifies the crash event into the driver's side. Also in accordance with this embodiment, actuation of a passenger's associated restraint device occurs only after the passenger's side accelerometer detects a deployment crash event into the passenger's side and the driver's side accelerometer verifies the crash event into the passenger's side.

Each digital value of acceleration from the driver's side accelerometer 22 is designated $A(k)$, where $A(k)$ represents the most recent sample, $A(k-1)$ the next most recent sample, and so forth. The six most recent digital values (i.e., $A(k-5)$, $A(k-4)$, $A(k-3)$, $A(k-2)$, $A(k-1)$, and $A(k)$) are stored in memory in the microcomputer 32. The microcomputer 32 uses these stored digital values to calculate a driver's crash value and a passenger's safing value.

Each digital value from the passenger's side accelerometer 34 is designated $A'(k)$, where $A'(k)$ represents the most recent sample, $A'(k-1)$ the next most recent sample, and so forth. The six most recent digital values (i.e., $A'(k-5)$, $A'(k-4)$, $A'(k-3)$, $A'(k-2)$, $A'(k-1)$, and $A'(k)$) are stored in memory in the microcomputer 44. The microcomputer 44 uses these stored digital values to calculate a passenger's crash value and a driver's safing value.

The driver's crash value is designated A_MA_DRIVER and represents the crash acceleration value sensed by accelerometer 22 in response to crash force into the driver's door, i.e., a value determined in response to positive acceleration signals from accelerometer 22. The passenger's safing value is designated A_SAFING_PASSENGER and represents a value sensed by accelerometer 22 in response to crash force into the passenger's door, i.e., a value determined in response to negative acceleration signals from accelerometer 22. A_MA_DRIVER is determined using a six point moving average in accordance with the formula $$A\_MA\_DRIVER = A(k-5)+A(k-4)+A(k-3)+A(k-2)+A(k-1)+A(k)/6 \quad (1)$$

A_SAFING_PASSENGER is determined using a three point moving average in accordance with the formula $$A\_SAFING\_PASSENGER = A(k-2)+A(k-1)+A(k)/3 \quad (2)$$

After calculating the crash value A_MA_DRIVER and safing value A_SAFING$_{13}$ PASSENGER, the microcomputer 32 outputs these values to the central module 12. Other formulas could be used to determine these two values.

The passenger's crash value is designated A_MA_PASSENGER, is determined using a six point moving average in accordance with the formula $$A\_MA\_PASSENGER = A'(k-5)+A'(k-4)+A'(k-3)+A'(k-2)+A'(k-1)+A'(k)/6 \quad (3)$$

The driver's safing value, designated A_SAFING_DRIVER, is determined using a three point moving average in accordance with the formula $$A\_SAFING\_DRIVER = A'(k-2)+A'(k-1)+A'(k)/3 \quad (4)$$

After calculating the passenger's crash value A_MA_Passenger and driver's safing value A_SAFING_DRIVER, the microcomputer 44 outputs these values to the central control module 12. Other formulas could be used to determine these two values.

In response to the crash and safing values output by the side modules 14 and 16, the central control module 12 determines whether a driver's side or passenger's side crash is occurring. To make this determination, the central control module 12 compares each of the crash and safing values against associated threshold values. The threshold values are stored in the memory of the central control module 12. Two threshold values are stored, a crash threshold value $T_c$ and a safing threshold value $T_s$. The crash threshold value $T_c$ has a positive value while the safing threshold value $T_s$ has a negative value. Those skilled in the art will appreciate that these determinations could be made in the side modules 14, 16 instead of in the central module 12, this being a preferred embodiment.

In accordance with one embodiment, the central control module 12 detects driver's side crashes from the A_MA_Driver crash value and the A_SAFING_DRIVER safing value. When A_MA_DRIVER is greater than the crash threshold value $T_c$ and A_SAFING_DRIVER is less than the safing threshold value $T_s$, the central control module 12 concludes that a driver side crash is occurring. In response to this determination, the central control module 12 activates the driver's side air bag assembly 18 to deploy the associated air bag.

The central module 12 uses the "less than" criterion for the safing value because of the 180° offset orientation between the axes-of-sensitivity of the accelerometers. When a driver side crash is occurring, the vehicle experiences an acceleration in a direction from the driver side to the passenger side, i.e., into the driver side. As a result, the acceleration signal 26 provided by the driver's side accelerometer 22 has a positive value. In contrast, the acceleration signal 38 provided by the passenger's side accelerometer 34 has a negative value. The "less than" criterion is used to determine when this negative value of acceleration has exceeded (i.e., become more negative than) a particular negative threshold.

The occurrence of a passenger's side crash is detected in a similar manner. In accordance with one embodiment, the central control module 12 monitors the A_MA_PASSENGER crash value and the A_SAFING_PASSENGER safing value. When A_MA_PASSENGER is greater than the crash threshold value $T_c$ and A_SAFING_PASSENGER is less (i.e., more negative) than the safing threshold value $T_s$, the central module 12 concludes that a passenger side crash is occurring. In response to this determination, the central module activates the passenger's side air bag assembly 20 to deploy the associated air bag.

In accordance with this embodiment of the present invention, the central module 12 utilizes a safing value determined from the accelerometer signal on the vehicle side opposite the crash. For example, in a driver's side crash condition the A_SAFING_Driver safing value is derived from the acceleration signal 38 provided by the passenger side accelerometer 34. With this arrangement, each sensor serves two sensing functions.

Figure 2:
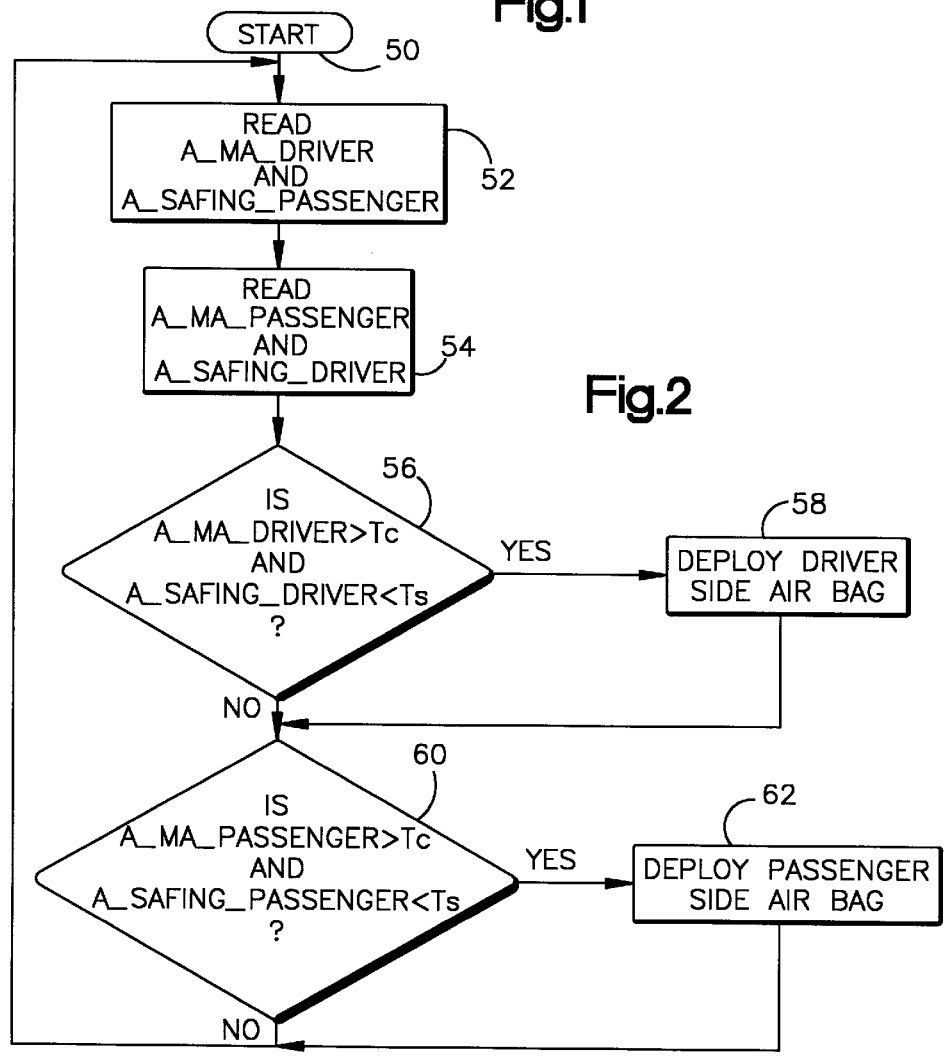
FIG. 2 is a flow-chart of the control process executed by the central control module of FIG. 1.

Referring to FIG. 2, the control process executed by the central control module 12 of FIG. 1 starts with step 50. In step 52, according to this embodiment, the central control module 12 reads the A_MA_DRIVER crash value and A_SAFING_PASSENGER safing value output from the microcomputer 32 in the driver side module 14. From step 52, the process goes to step 54. In step 54, according to this embodiment, the central module 12 reads the A_MA_PASSENGER crash value and the A_SAFING_DRIVER safing value output from the microcomputer 44 in the passenger side module 16. The process then proceeds to step 56.

In step 56, according to this embodiment, the central module 12 determines whether A_MA_DRIVER is greater than the crash threshold value $T_c$ and A_SAFING_DRIVER is less than the safing threshold value $T_s$. If the determination in step 56 is affirmative, a driver's side crash is occurring. In this situation, the process goes to step 58 and the central module 12 activates the driver side air bag assembly 18 to deploy the driver's side air bag. If the determination in step 56 is negative, then a driver's side crash is not occurring and the process proceeds to step 60. If the driver's side air bag was deployed in step 58, the process proceeds to step 60.

In step 60, according to this embodiment, the central module determines whether A_MA_PASSENGER is greater than the crash threshold value $T_c$ and A_SAFING_PASSENGER is less than the safing threshold value $T_s$. If the determination in step 60 is affirmative, a passenger's side crash is occurring. In this situation, the process goes to step 62 and the central module 12 activates the passenger's side air bag assembly 20 to deploy the passenger side air bag. If the determination in step 60 is negative, however, the process goes back to step 52. If the passenger's side air bag was deployed in step 62, the process loops back to step 52.

The central module 12 continuously monitors and evaluates the crash and safing values output by the side modules 14 and 16.

Figure 3:
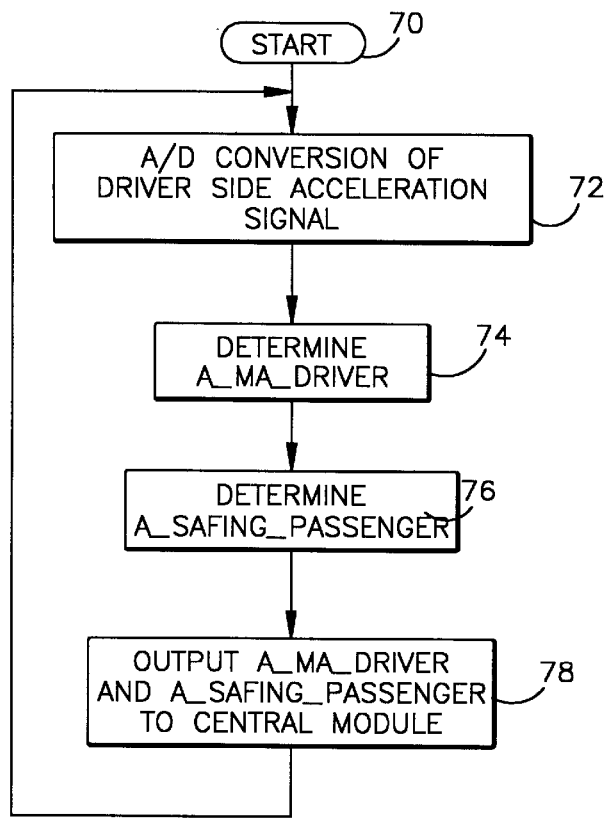
FIG. 3 is a flow-chart of the control process of the driver side module of FIG. 1.

Referring to FIG. 3, the process executed by the driver's side module 14 shown in FIG. 1 starts in step 70 and proceeds to step 72. In step 72, the driver's side module 14 performs the A/D conversion of the filtered acceleration signal 30. The process thereafter goes to step 74 and determines the A_MA_DRIVER crash value in accordance with formula (1). From step 74, the process goes to step 76 and determines the A_SAFING_PASSENGER safing value in accordance with formula (2). The process, according to this embodiment, then goes to step 78 and the driver side module 14 outputs the A_MA_DRIVER and A_SAFING_PASSENGER values to the central module 12. After executing step 78, the process loops back to step 72. The driver's side module 14 continuously executes the process defined by steps 72 to 78.

Figure 4:
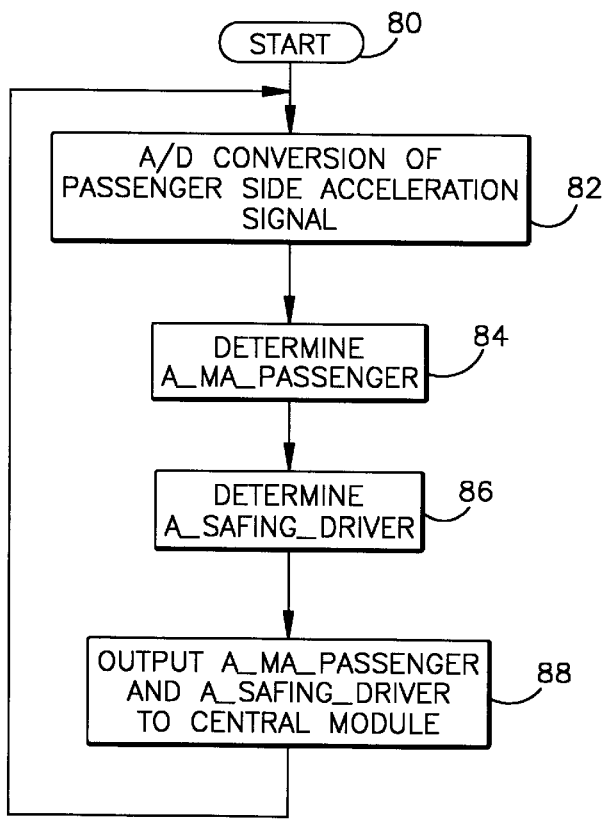
FIG. 4 is a flow-chart of the control process of the passenger side module of FIG. 1.

Referring to FIG. 4, the process executed by the passenger's side module 16 shown in FIG. 1 starts in step 80 and proceeds to step 82. In step 82, the passenger's side module 16 performs the A/D conversion of the filtered acceleration signal 42. The process thereafter goes to step 84 and determines the A_MA_PASSENGER crash value in accordance with formula (3). From step 84, the process goes to step 86 and determines the A_SAFING_DRIVER safing value in accordance with formula (4). The process, according to this embodiment, then loops to step 88 and the passenger's side module 16 outputs the A_MA_PASSENGER and A_SAFING_DRIVER values to the central module 12. After executing step 88, the process goes back to step 82. The passenger's side module 16 continuously executes the process defined by steps 82 to 88.

The values, according to this embodiment, determined in steps 72–78 and 82–88 are those output to central control module 12 and those used in steps 52 and 54 of FIG. 2.

Those skilled in the art will appreciate that other than a six point moving average process may be used in the discriminating crash event determination. Combinations of moving averages may be used and ORed together. For example, a three point moving average may be compared against an associated threshold and that comparison result ORed with the result of a six point moving average compared against its associated threshold value.

In the system described, each accelerometer provides distinguishably different signals for accelerations in two opposing directions. Thus, each accelerometer provides one signal for accelerations caused by impacts on its respective side of the vehicle, and another, distinguishably different, signal for accelerations caused by impacts on the opposite side of the vehicle. Therefore, two sensors provide redundant detection of crashes on either side of the vehicle. The sensor on the same side as the crash (the discriminating sensor) will provide a large acceleration signal, and the sensor on the other side of the vehicle (the safing sensor) will provide a smaller, distinguishably different acceleration signal. Reliability is enhanced by using the output of the opposite side sensor to verify that the output of the discriminating sensor.

Figure 5:
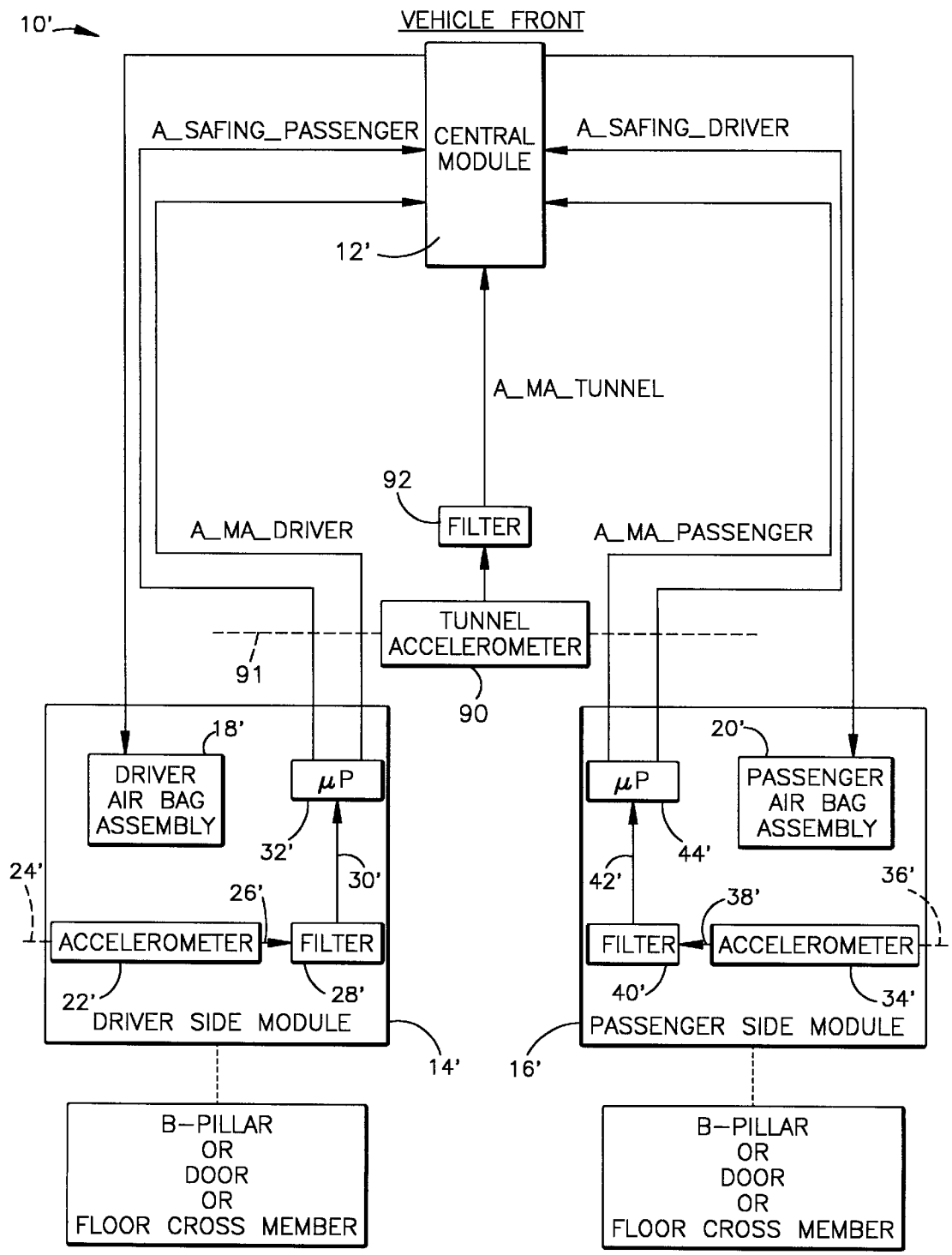
FIG. 5 is a block diagram of a vehicle side impact restraint system in accordance with another embodiment of the present invention.

Referring to FIG. 5, a vehicle side impact restraint system 10', in accordance with another embodiment of the present invention, is shown. The system of FIG. 5 is a modified version of that shown in FIG. 1. Like elements in the Figures are like numbered. The like elements in FIG. 5 have a prime designation following the number.

The system 10' includes a central control module 12'. The central control module 12' is preferably a microcomputer programmed to execute a desired control process. A driver's side module 14' is connected to the central control module 12'. A passenger's side module 16' is connected to the central control module.

The driver's side module 14' includes an accelerometer 22'. The accelerometer 22' senses acceleration in a direction parallel to its axis of sensitivity 24' and provides an accelerometer signal 26' indicative of the sensed crash acceleration along its axis of sensitivity. The accelerometer 22' is, in accordance with one embodiment, mounted in a vehicle driver's side door such that its axis of sensitivity 24' is transverse to the vehicle direction of travel, i.e., transverse to the fore and aft direction of the vehicle. The accelerometer 22' could be mounted at other locations on the driver's side such as the B-pillar or floor cross member. The axis of sensitivity 24' is oriented so that the acceleration signal 26' has a positive value when the sensed acceleration has a component toward the center of the vehicle, i.e., into the door. When an impact into the driver side of the vehicle occurs, the acceleration signal 26' has a positive value. An impact to the passenger side of the vehicle will result in the acceleration signal 26' having a negative value.

A filter 28' filters the acceleration signal 26' and outputs a filtered acceleration signal 30'. The filter 28' functions as an anti-alias filter to block frequencies in the acceleration signal above a certain cutoff value. Such frequencies could result in aliasing of the analog filtered acceleration signal 30' when this signal is converted to a digital signal.

A microcomputer 32' periodically samples the filtered acceleration signal 30' and performs an analog-to-digital ("A/D") conversion on each sample. The sample rate of the microcomputer 32' is chosen to satisfy known sampling criteria and guarantee that the digital values accurately represent the filtered acceleration signal 30'.

The passenger side module 16' is similar to the driver side module 14'. It includes an accelerometer 34' which senses acceleration along its axis of sensitivity 36' and provides an acceleration signal 38' indicative thereof. The accelerometer 34' is, in accordance with one embodiment of the present invention, mounted in a vehicle passenger side door such that its axis of sensitivity 36' is substantially transverse to the vehicle direction of travel, i.e., substantially transverse to the fore and aft direction of the vehicle. The accelerometer 34' could be mounted at other locations on the passenger's side such as the B-pillar, floor cross member or other location spaced apart from and substantially opposite the location of accelerometer. The axis of sensitivity 36' is oriented so that the acceleration signal 38' has a positive value when the sensed acceleration has a component into the passenger side of the vehicle. Thus, when an impact to the passenger side of the vehicle occurs, the acceleration signal 38' has a positive value. An impact to the driver side of the vehicle will, conversely, cause the acceleration signal 38' to have a negative value.

A filter 40' filters the acceleration signal 38' and outputs a filtered acceleration signal 42'. The filter 40' functions as an anti-alias filter to block frequencies above a cutoff value which could result in aliasing when the analog filtered acceleration signal 42' is converted to a digital signal.

A microcomputer 44' periodically samples the filtered acceleration signal 42' and performs a conversion on each sample. The A/D conversion of a sample results in a digital value representing the analog value of that sample. The sample rate of the microcomputer 44' is chosen to satisfy known sampling criteria and guarantee that the digital values accurately represent the filtered acceleration signal 42'.

Since the vehicle acceleration monitored by each accelerometer 22' and 34' has two sensing capabilities, i.e., positive and negative or into the driver's or passenger's side, the single sensor associated with a single side of the vehicle can serve two functions. First, a positive crash acceleration value from the driver's side accelerometer 22' is used to detect a crash event into the driver's side of the vehicle. In this mode, the sensor functions as a discriminating sensor. Second, the negative output from the driver's side accelerometer 22' is used as a passenger's side safing function for the purpose of verifying an event into the passenger's side of the vehicle.

Similarly, the positive acceleration signal from the passenger's side accelerometer 34' is used to detect a crash event into the passenger's side of the vehicle. In this mode, the sensor functions as a discriminating sensor. A negative output from the passenger's side accelerometer 34' is used as the driver's side safing function to verify a crash event into the driver's side of the vehicle.

The driver's crash value is designated A_MA_DRIVER and represents the crash acceleration value sensed by accelerometer 22' in response to crash force into the driver's door, i.e., a value determined in response to positive acceleration signals from accelerometer 22'. The passenger's safing value is designated A_SAFING_PASSENGER and represents a value sensed by accelerometer 22' in response to crash force into the passenger's door, i.e., a value determined in response to negative acceleration signals from accelerometer 22'. A_MA_DRIVER is determined using a six point moving average. A_SAFING_PASSENGER is determined using a three point moving average. After calculating the crash value A_MA_DRIVER and safing value A_SAFING_PASSENGER, the microcomputer 32' outputs these values to the central module 12'.

The passenger's crash value is designated A_MA_PASSENGER, is determined using a six point moving average. The driver's safing value, designated A_SAFING_DRIVER, is determined using a three point moving average. After calculating the passenger's crash value A_MA_PASSENGER and driver's safing value A_SAFING_DRIVER, the microcomputer 44', according to this embodiment, outputs these values to the central control module 12'.

A third accelerometer 90 is located at an interior location of the vehicle spaced apart from and between the driver's and passenger's doors. Preferably, accelerometer 90 is mounted in the transmission tunnel of the vehicle with its axis 91 of sensitivity oriented parallel to the axes 24' and 34', i.e., substantially transverse to the fore and aft direction of the vehicle. The output of accelerometer 90 provides an acceleration signal indicative of sensed acceleration in a sideways direction. Moreover, the accelerometer 90 is oriented so that its acceleration signal has a positive value when the sensed acceleration has a component into the driver's side of the vehicle. Thus, when an impact to the driver's side of the vehicle occurs, the acceleration signal from accelerometer 90 has a positive value. An impact to the passenger's side of the vehicle will, conversely, cause the acceleration signal from the accelerometer 90 to have a negative value.

A filter 92 filters the acceleration signal from the accelerometer 90 and outputs a filtered acceleration signal. The filter 92 functions as an anti-alias filter to block frequencies above a cutoff value which could result in aliasing when the analog filtered acceleration signal is converted to a digital signal. The output of filter 92 is a signal referred to as A_MA_TUNNEL and is connected to the central control module 12'.

According to this embodiment, in response to the crash and safing values output by the side modules 14' and 16' and in response to the crash value determined from accelerometer 90, the central control module 12' determines whether a driver's side or passenger's side crash is occurring. To make this determination, the central control module 12' compares each of the crash values from the three sensors against associated threshold values. The threshold values are stored in the memory of the central control module 12'. The stored threshold values include a crash threshold value $T_c$ for the doors, a safing threshold value $T_s$, and secondary safing crash threshold values $T_t$ and $-T_t$. The crash threshold value $T_c$ has a positive value while the safing threshold value $T_s$. has a negative value. Those skilled in the art will appreciate that other numeric nomenclature may be used. The nomenclature used herein are selected for purposes of explanation only and are not meant to limit the present invention. Those skilled in the art will appreciate that the comparisons of the values determined from accelerometer 22' and 34' could be done in the side modules 14' and 16', respectively, this being a preferred embodiment.

In accordance with one embodiment, the central control module 12' detects driver's side crashes from the A_MA_DRIVER crash value, the crash value A_MA_TUNNEL determined from the tunnel accelerometer 90, and the A_SAFING_DRIVER safing value. When A_MA_DRIVER is greater than the crash threshold value $T_c$ and when A_MA_TUNNEL is greater than $T_t$ or A_SAFING_DRIVER is less than the safing threshold value $T_s$, the central control module 12' concludes that a driver side crash is occurring. In response to this determination, the central control module 12' activates the driver's side air bag assembly 18' to deploy the associated air bag.

The occurrence of a passenger's side crash is detected in a similar manner. According to this embodiment, central control module 12' monitors the A_MA_PASSENGER crash value, the tunnel crash value A_MA_TUNNEL, and the A_SAFING_PASSENGER safing value. When the A_MA_PASSENGER value is greater than the crash threshold value $T_c$ and when the tunnel crash value A_MA_TUNNEL is less than $-T_t$ or the A_SAFING_PASSENGER value is at the same time less than the safing threshold value $T_s$, the central module 12' concludes that a passenger side crash is occurring. In response to this determination, the central module 12' activates the passenger's side air bag assembly 20' to deploy the associated air bag.

Figure 6:
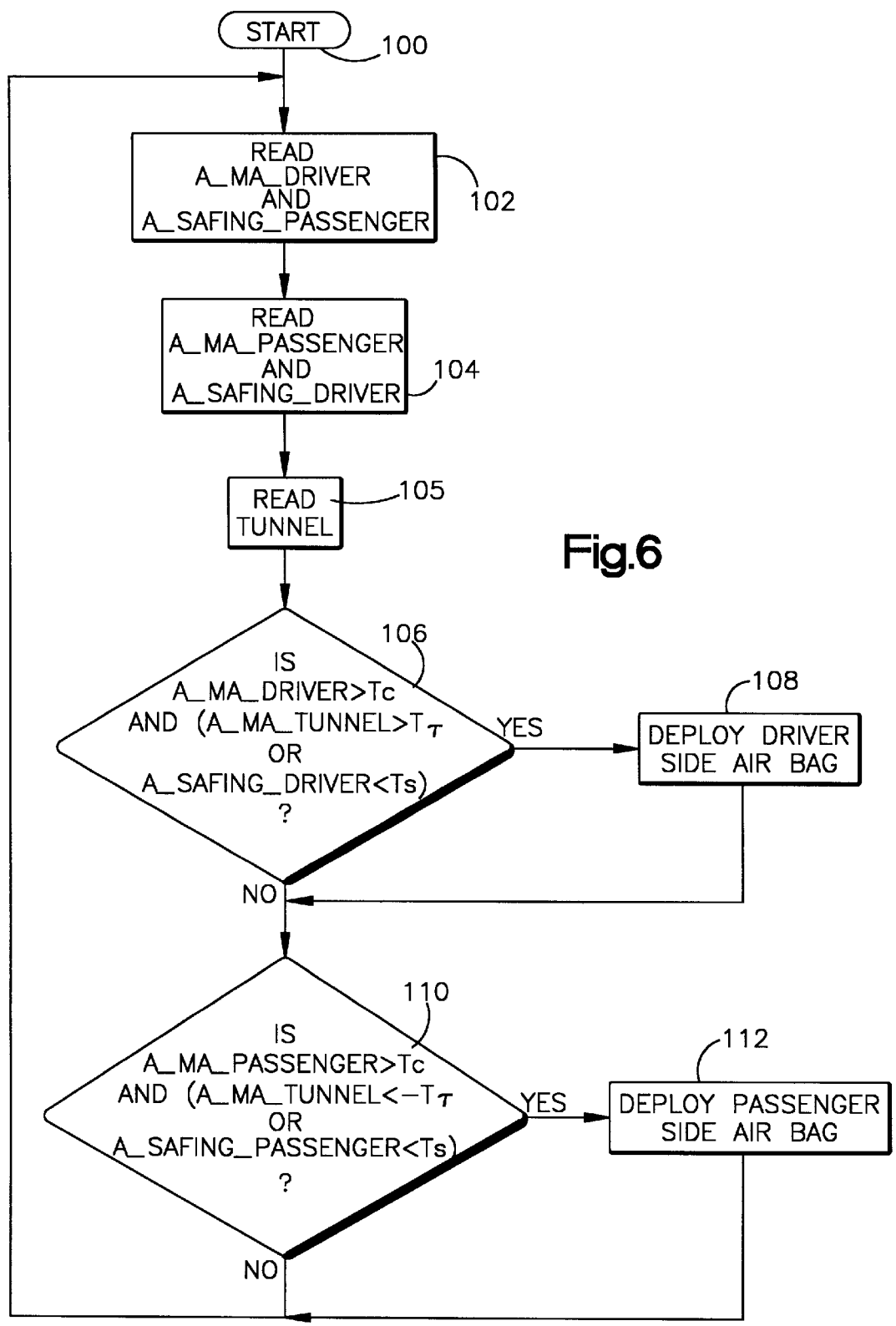
FIG. 6 is a flow-chart of the control process executed by the central control module of FIG. 5.

Referring to FIG. 6, the control process executed by the central control module 12' of FIG. 5 starts with step 100. In step 102, according to this embodiment, the central control module 12' reads the A_MA_DRIVER crash value and A_SAFING_PASSENGER safing value output from the microcomputer 32' in the driver side module 14'. From step 102, the process goes to step 104. In step 104, according to this embodiment, the central module 12' reads the A_MA_PASSENGER crash value and the A_SAFING_DRIVER safing value output from the microcomputer 44' in the passenger side module 16'. The control module 12' reads the tunnel accelerometer in step 105 and then determines the crash values A_MA_TUNNEL. The process then proceeds to step 106.

In step 106, according to this embodiment, the central module 12' determines whether A_MA_DRIVER value is greater than the crash threshold $T_c$ and whether the value A_MA_TUNNEL is greater than $T_t$, or whether A_SAFING_DRIVER is less than the safing threshold value $T_s$. If the determination in step 106 is affirmative, a driver's side crash is occurring. In this situation, the process goes to step 108 and the central module 12' activates the driver side air bag assembly 18' to deploy the driver's side air bag. If the determination in step 106 is negative, then a driver's side crash is not occurring and the process proceeds to step 110. If the driver's side air bag was deployed in step 108, the process proceeds to step 110.

In step 110, according to this embodiment, the central module determines whether A_MA_PASSENGER is greater than the crash threshold $T_c$ and whether A_MA_TUNNEL value is less than $-T_t$ or whether A_SAFING_PASSENGER is less than the safing threshold $T_s$. If the determination in step 110 is affirmative, a passenger's side crash is occurring. In this situation, the process goes to step 112 and the central module 12' activates the passenger's side air bag assembly 20' to deploy the passenger side air bag. If the determination in step 110 is negative, however, the process goes back to step 102. If the passenger's side air bag was deployed in step 112, the process loops back to step 102. The central module 12', according to this embodiment, continuously monitors and evaluates the crash and safing values output by the side modules 14' and 16' and the output from the tunnel accelerometer.

In accordance with the embodiment of the present invention shown in FIGS. 5 and 6, actuation of a driver's associated restraint device occurs only after a driver's side accelerometer detects a deployment crash event into the driver's side and the crash event into the driver's side is verified by either the tunnel accelerometer or the passenger's safing sensor signal. Actuation of a passenger's associated restraint device occurs only after the passenger's side accelerometer detects a deployment crash event into the passenger's side and the crash event into the passenger's side is verified by either the tunnel sensor or the driver's safing sensor signal.

In the described embodiment, each acceleration signal was averaged over time and then compared against a threshold. Other algorithmic analysis techniques could instead be used. Moreover, different algorithms could be used to analyze the discriminating crash event and the safing values.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraint, comprising:

first acceleration sensing means having an axis of sensitivity and mounted to a vehicle at a first side location for providing a discriminating crash acceleration signal when a sideways crash acceleration of the vehicle is sensed in a first direction;

second acceleration sensing means having an axis of sensitivity and mounted to a second side location of the vehicle spaced apart from and substantially opposite said first side location for providing a safing crash acceleration signal when crash acceleration is sensed in said first direction;

third acceleration sensing means having an axis of sensitivity and mounted to the vehicle at a third location of the vehicle spaced apart from and substantially between said first and second side locations for providing a safing crash acceleration signal when crash acceleration is sensed in said first direction; and means for actuating said actuatable restraint when said first crash sensing means provides said discriminating crash acceleration signal and when either said second or said third crash sensing means provides its associated safing crash acceleration signal.

2. The apparatus of claim 1 wherein the vehicle has a driver's side and a passenger's side and said first side location is on the driver's side of the vehicle and said second side location is on the passenger's side of the vehicle.

3. An apparatus for controlling an actuatable restraint, comprising:

first acceleration sensing means having an axis of sensitivity and mounted to the vehicle at a first location of the vehicle with the axis of sensitivity of said first acceleration sensing means oriented in a first direction, said first acceleration sensing means providing a discriminating crash signal when crash acceleration is sensed in said first direction;

second acceleration sensing means having an axis of sensitivity and mounted to the vehicle at a second location of the vehicle with the axis of sensitivity of said second acceleration sensing means being oriented substantially parallel with said first direction and 180 degrees from the axis of sensitivity of said first acceleration sensing means, said second acceleration sensing means providing a safing crash signal when crash acceleration is sensed in said first direction;

third acceleration sensing means having an axis of sensitivity and mounted to the vehicle at a third location of the vehicle with the axis of sensitivity of said third acceleration sensing means being substantially parallel with said first direction and providing a secondary safing crash signal when crash acceleration is sensed in said first direction; and means for actuating said actuatable restraint when said first crash sensing means provides said discriminating crash signal and when either said third crash sensing means provides said secondary safing crash signal or said second crash sensing means provides said safing crash signal.

4. An apparatus for controlling actuation of a first actuatable restraint and a second actuatable restraint, comprising:

first crash sensing means for providing a first discriminating crash signal when a crash event is sensed in a first direction and a first safing crash signal when a crash event is sensed in a second direction;

second crash sensing means for providing a second safing crash signal when a crash event is sensed in said first direction and a second discriminating crash signal when a crash event is sensed in said second direction;

third crash sensing means for providing a third safing crash signal when a crash event is sensed in said first direction and a fourth safing crash signal when a crash event is sensed in said second direction;

means for actuating said first actuatable restraint when said first crash sensing means provides said discriminating crash signal and when either said third crash sensing means provides said third safing crash signal or said second crash sensing means provides said second safing crash signal; and means for actuating said second actuatable restraint when said first crash sensing means provides said first safing crash signal or said third crash sensing means provides said fourth safing crash signal and said second crash sensing means provides said second discriminating crash signal.

5. The apparatus of claim 4 wherein each of said first crash sensing means, said second crash sensing means, and said third crash sensing means are accelerometers.

6. The apparatus of claim 5 wherein said first restraint is an air bag operatively mounted in a side assembly of a vehicle having a driver's side and a passenger's side, said air bag being associated with the vehicle driver's side and wherein said second restraint is an air bag operatively mounted in a side assembly of the vehicle associated with the vehicle passenger's side.

7. The apparatus of claim 6 wherein said first crash sensing means is mounted in a driver's side B-pillar, door, or floor cross member of said vehicle, said second crash sensing means is mounted in a passenger's side B-pillar, door, or floor cross member of said vehicle, and wherein said third crash sensing means is mounted at a central location of said vehicle.

8. Apparatus for use in a vehicle having a driver's side, a passenger's side, a side impact restraint for protecting a driver against side impacts and a side impact restraint for protecting a passenger against side impacts, comprising:

a first accelerometer, mounted on the driver's side of the vehicle and sensitive to sideways acceleration of the vehicle and providing an output signal indicative thereof;

a second accelerometer, mounted on the passenger's side of the vehicle and sensitive to sideways acceleration of the vehicle and providing an output signal indicative thereof;

a third accelerometer, mounted at a central location of the vehicle and sensitive to sideways acceleration of the vehicle and providing an output signal indicative thereof; and control means for actuating the side impact restraint for the driver only when the signals from the first accelerometer and when either the signal from the second or the third accelerometer indicate that an impact is occurring on the driver's side of the vehicle and for actuating the side impact restraint for the passenger only when either the signal from the first accelerometer or the third accelerometer and when the second accelerometer indicate that an impact is occurring on the passenger's side of the vehicle.

9. A method for controlling actuation of a first actuatable restraint and a second actuatable restraint, said method comprising the steps of:

sensing a crash acceleration using a first acceleration sensor, said first acceleration sensor providing a first discriminating crash signal when a crash event is sensed in a first direction and providing a first safing crash signal when a crash event is sensed in a second direction;

sensing a second crash acceleration using a second acceleration sensor, said second acceleration sensor providing a second safing crash signal when a crash event is sensed in said first direction and providing a second discriminating crash signal when a crash event is sensed in said second direction;

sensing a secondary safing crash acceleration using a third crash sensing means, said third acceleration sensor providing a third safing crash signal when a crash event is sensed in said first direction and a fourth safing crash signal when a crash event is sensed in said second direction;

actuating said first actuatable restraint when said first crash sensing means provides said first discriminating crash signal and when either (i) said second crash sensing means provides said second safing crash signal or (ii) said third crash sensing means provides said third safing crash signal; and actuating said second actuatable restraint when either (i) said first crash sensing means provides said first safing crash signal or (ii) said third crash sensing means provides said fourth safing crash signal and when said second crash sensing means provides said second discriminating crash signal.

* * * * *